(12) United States Patent
McLaine

(10) Patent No.: US 6,294,137 B1
(45) Date of Patent: Sep. 25, 2001

(54) HIGH VOLTAGE ELECTROSTATIC FIELD FOR TREATMENT OF FLOWING LIQUIDS

(76) Inventor: Paul McLaine, 299 Industrial Park Dr., Nazareth, PA (US) 18064

( * ) Notice: Subject to any disclaimer, the term of this patent is extended or adjusted under 35 U.S.C. 154(b) by 0 days.

(21) Appl. No.: 09/456,462

(22) Filed: Dec. 8, 1999

(51) Int. Cl.$^7$ .................................................. B01J 19/08
(52) U.S. Cl. ...................... 422/186.04; 204/667; 204/671
(58) Field of Search ...................................... 204/667, 671; 422/186.04

(56) References Cited

U.S. PATENT DOCUMENTS

| | | | |
|---|---|---|---|
| 4,073,712 | 2/1978 | Means et al. | 204/667 |
| 4,886,593 | * 12/1989 | Gibbs | 204/667 |
| 5,591,317 | * 1/1997 | Pitts, Jr. | 204/667 |
| 5,681,457 | * 10/1997 | Mahoney | 204/667 |

* cited by examiner

Primary Examiner—Kishor Mayekar

(57) ABSTRACT

The present invention comprises an insertion type electrode adapted to operate at modulated high voltages by use of a thin layer polyer as a dielectric.

7 Claims, 5 Drawing Sheets

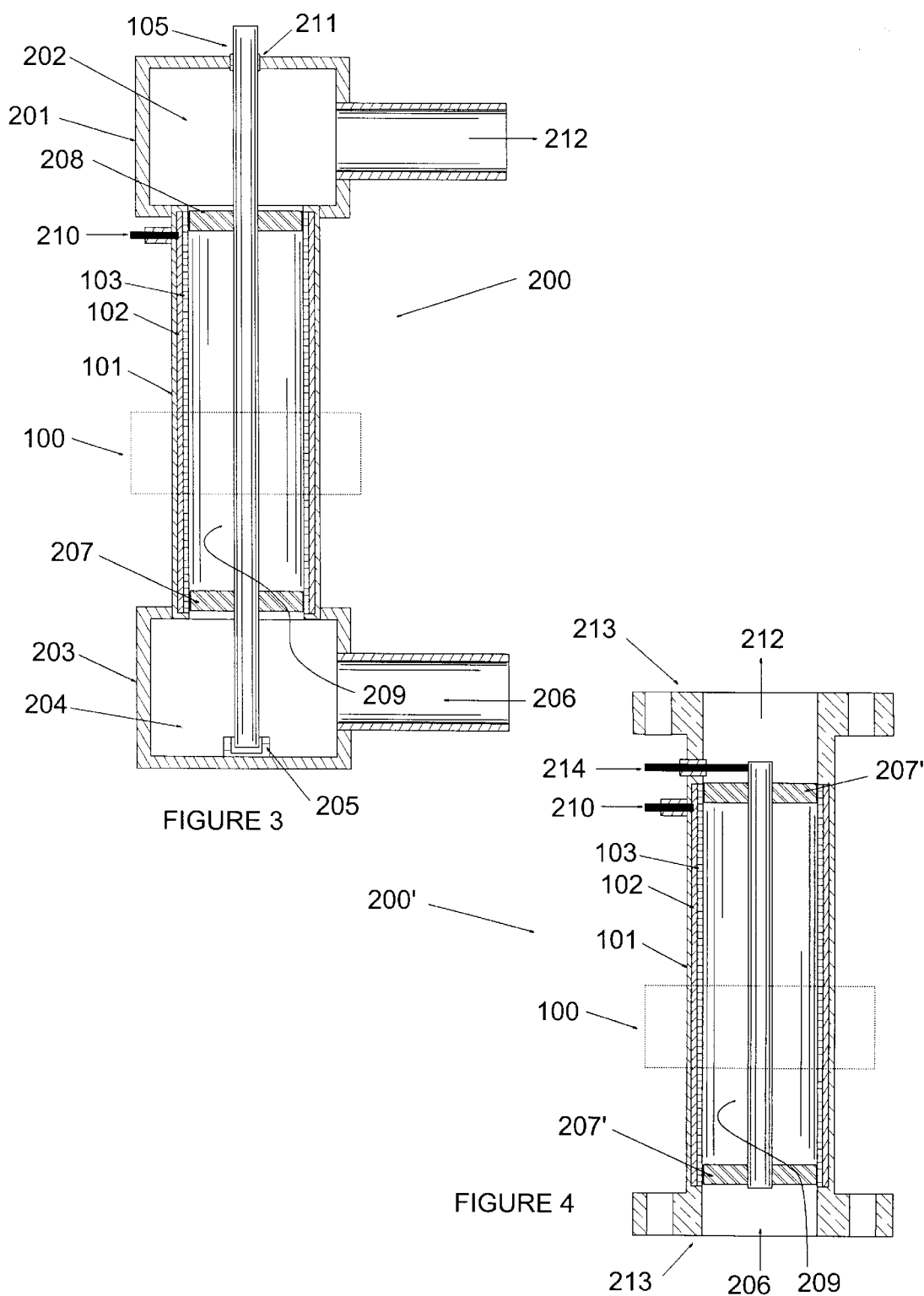

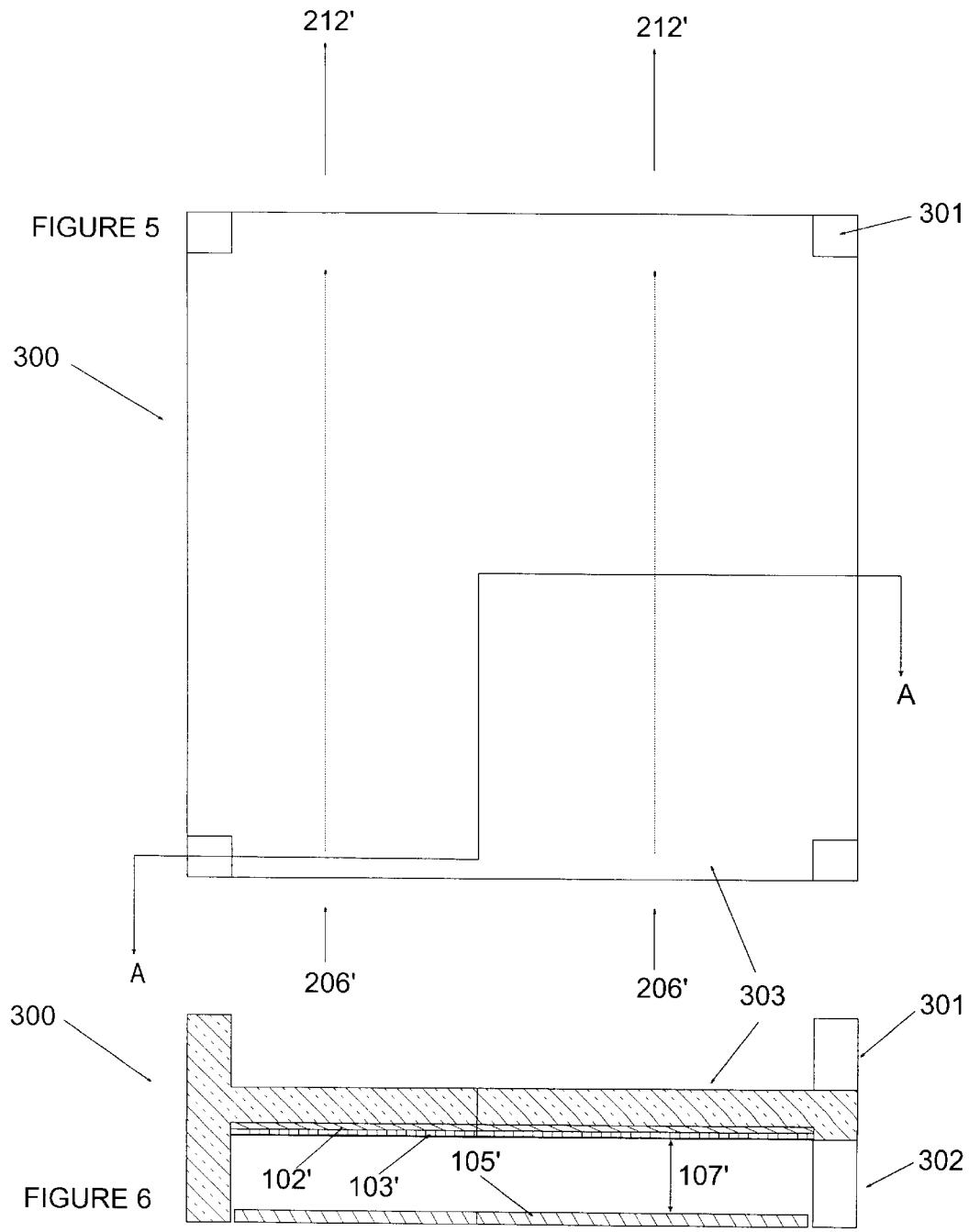

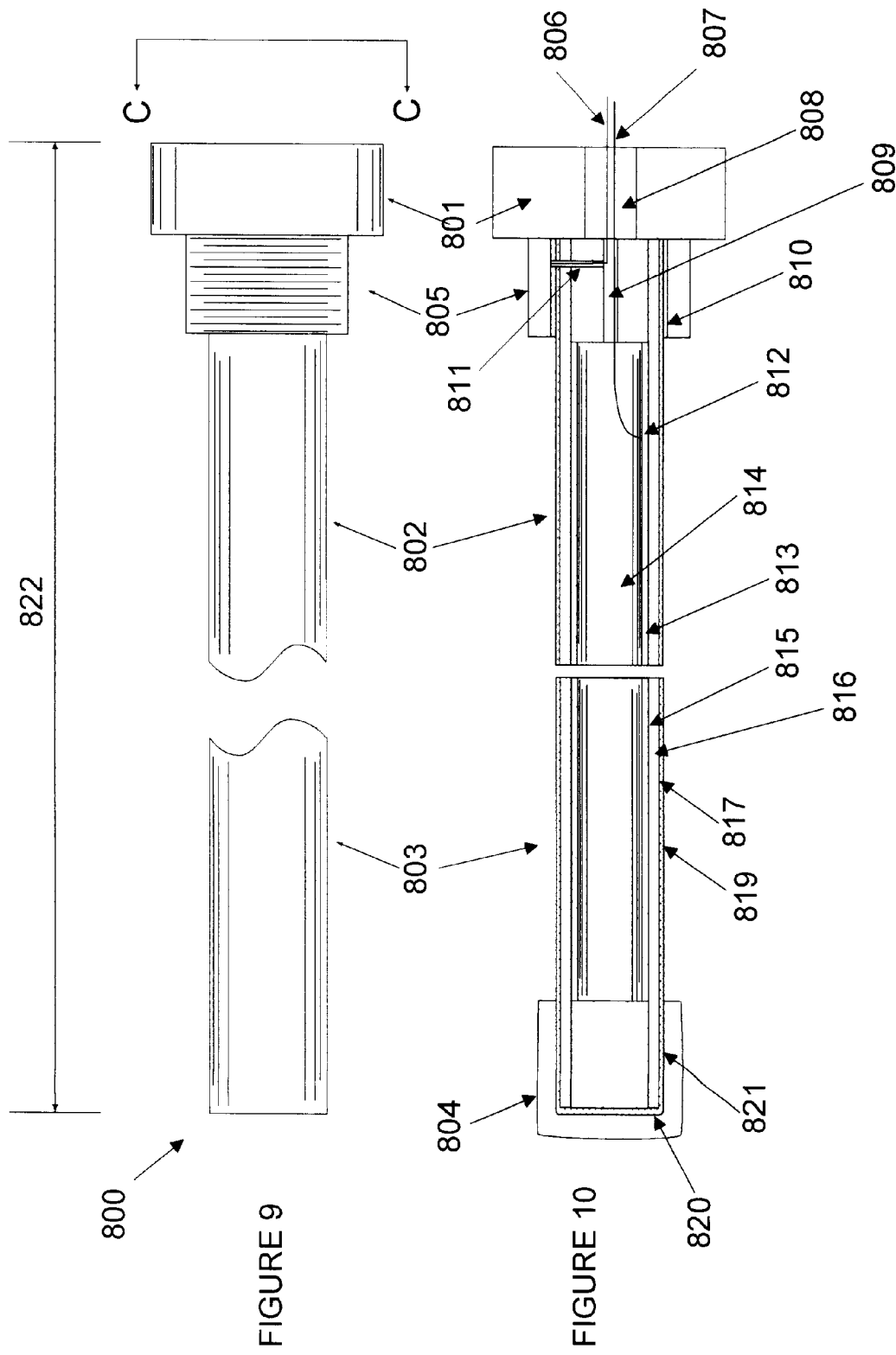

HIGH VOLTAGE ELECTROSTATIC FIELD FOR TREATMENT OF FLOWING LIQUIDS

BACKGROUND AND SUMMARY OF THE INVENTION

The present invention relates to electrostatic treatment of fluid systems and more particularly to the construction and operation treating devices having electrostatic fields.

Apparatus for the treatment of moving liquid by causing electric current flow or discharge therein and/or impressing electrically induced fields thereacross have been known for many years, but the application of such devices to common industrial and domestic problems, such as water system scaling and clogging, has met with varying success. Some installations have appeared to be functional while others which seemed to be operating under generally similar circumstances obviously failed and no broadly accepted reasons for the different results have been advanced. The optimum type, size and characteristics of a treater to produce desired and reliable results in a particular environment appear to have been unnecessarily limited with respect to DC voltage imposed on the electrostatic field. A predictive method is disclosed in U.S. Pat. No. 4,073,712 wherein a positively charged axially placed conduit electrode insulated by a dielectric material provides an electrostatic field through flowing water in the conduit whereabout the conduit has a negatively charged electrode, thereby providing a three capacitor system.

A large number of factors and complex interactions are apparently involved in the treating process. This seems logical since such liquid systems are themselves usually highly complex, including variations in dissolved salts, suspended solids, turbulence, pH, piping, electrical environment, temperature, pressure, etc. Many liquid clogging mechanisms, including water system scaling, involve the electrostatic relations between suspended particles, the carrier liquid and the walls of the piping network. Thus, an electrostatic field effectively developed across a section of flowing water primarily affects not only the water, but mainly suspended, especially colloidal size, particles immersed in the water. The effect of the field will depend, in large measure, upon the relationship of the natural electrostatic charge on such immersed particles to the electrostatic charge on the various surfaces of the treater and how the latter charge induces a response on the liquid contacting surfaces of the piping network. If relative conditions are proper, the particles will be urged by the field to remain in suspension or migrate toward a charged electrode isolated from the walls of the piping network, thus reducing the tendency to form flow restricting deposits. The reduction of colloid particles which are capable of acting as seeds for nucleation of scale building crystal formations results in reduced tendency for scale deposition.

The natural electrostatic charge on the immersed particles in the liquid, or more accurately, the overall charge effect of the various groups of particles normally associated in the same system, can be determined by known procedures, but the control of the electrostatic charge on critical treater surfaces has been heretofore very limited due to configuration of the electrodes. The present invention reverses a decades old method of fabricating conduit electrostatic field treatment devices such that the positive, ground electrode is situated generally within the axial space of the conduit, whereabout are situated dielectric insulated negatively charged electrode(s) such that the liquid flowing in the conduit becomes negatively charged for later process advantage.

The electrostatic field between particular water treater surfaces, in large part, can be predicted and controlled by limiting certain parameters in treater construction and installation, especially the dielectric constant of the insulating material or materials in contact with the water, the efficiency of the insulating material or materials and seals in preventing charge leakage, and the physical size ratio of the treater parts which form the surfaces producing the electrostatic field across the water complex under treatment. The word "water", as used herein, means water complexes containing dissolved and suspended solids, etc., as are normally found in a great many industrial and domestic applications. Of more importance, however, is to provide a method whereby high DC voltages may be effectively developed across the flowing fluids.

The manipulation of electrical potentials, to produce relationships within certain parameters calculated from an equation which presents a mathematical model of the treater as three capacitors connected in series, results in operable treaters, while devices having relationships falling outside those parameters are apparently less-functional or only marginal in operation. The parameters of those variables are described with reference to a specific example below.

The principal objects of the present invention are: to provide operable and efficient electrostatic water treaters; to provide such treaters which function to predictably inhibit the formation of scale from colloidal particles immersed in flowing water; to provide a treater construction which substantially reduces the formation of scale in piping systems and may function to remove scale already formed; to provide a method of designing operable and efficient electrostatic treaters for particular installations; to provide a method of treating water to reliably inhibit the formation of certain clogging deposits in the piping system containing same; to provide a dependable alternative to many types of chemical water treatment; and to provide such methods and apparatus which have wide application in improving desired properties of water for industrial and domestic purposes at minimal cost and maximum safety.

In specific examples of the invention, DC voltage is applied across the electrodes at a range unexpectedly high in relation to the teaching of the prior art in this field. The placement of sufficient axially facing positively charged electrode surface area or a plurality of separate electrodes and surfaces about an axial space-occupying negative ground electrode dramatically increase the surface area in which negative charge may be extended into the flowing liquid, thereby permitting comparatively extremely high DC voltages.

The present invention comprises an insertion type electrode adapted to operate at modulated high voltages by use of a thin layer polymer as a dielectric.

BRIEF DESCRIPTION OF THE DRAWINGS

FIG. 3 is a cutaway side view of an treater according the present invention whereby an inlet and outlet portions are formed at a right angle to the treater conduit.

FIG. 4 is a cutaway side view of an treater according the present invention whereby an inlet and outlet portions are formed with straight-on flanges for abutting conduits for connection to the treater conduit.

FIG. 5 is a top view of a plate embodiment of the treater of the present invention.

FIG. 6 is the Section A—A of FIG. 5.

FIG. 9 is a side view of a threaded base supporting electrode of the present invention.

FIG. 10 is a cross section CC of FIG. 9.

DETAILED DESCRIPTION OF THE INVENTION

Figure 1:
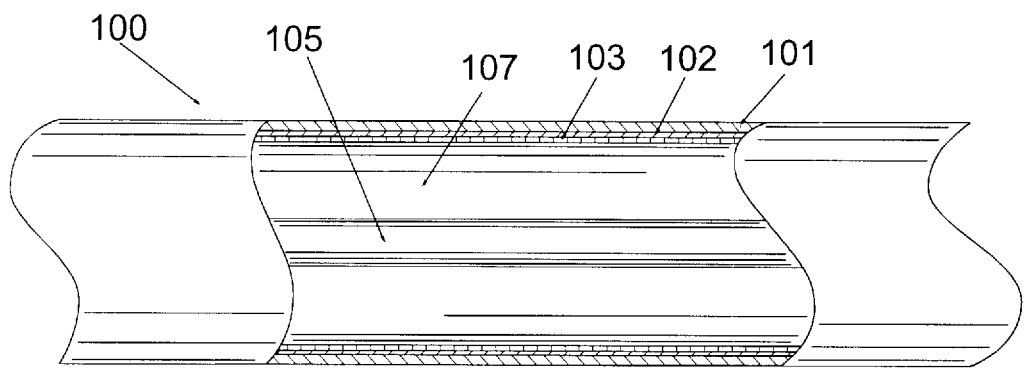
FIG. 1 is a side view of a cutaway section of a treater according to the present invention.
Figure 2:
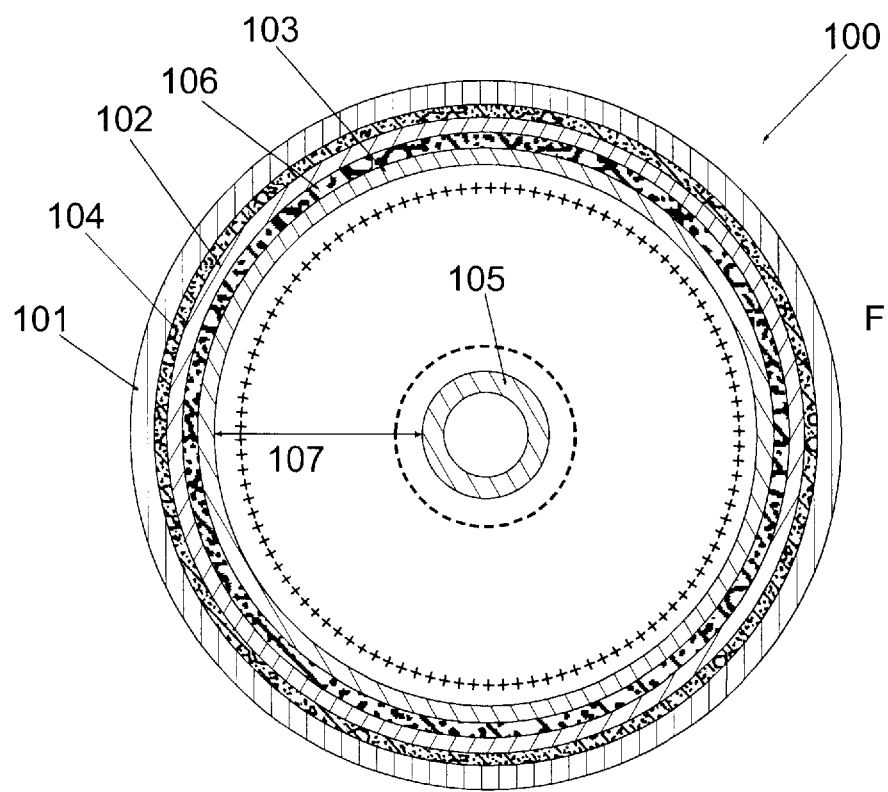
FIG. 2 in a cross sectional view of cylindrical conduit treater according to the present invention.

The invention is now discussed with reference to the Figures. In FIG. 1, a treater section 100 is adapted to operation within a cylindrical support conduit 101, which is preferably made of PVC or fiberglass or similar relatively non-conductive material as compared with metal pipes. The present invention contemplates the use of a wide variety of support conduit materials, not excluding metal pipes and other such conductive conduits, however it is most preferred that the immediate support tube layer closest to the positive electrode 102 consist primarily of non-conductive polymer materials. As shown in FIG. 2, the separation of the electrode 102 and support conduit 101 is improved with addition of a non-conductive insulation epoxy layer 104 which may optionally and preferably form a continuous protective sheath between the cylindrical support conduit 101 and cylindrical electrode 102. The addition of this epoxy layer 104 may in some circumstances be sufficient, in addition to or in combination with an intervening non-conductive support conduit 101, to permit the use of a more structurally acceptable metal support conduit about the electrode 102 without severely disabling the electrostatic capacitance required for operation of the present treater.

Electrode 102 is connected to a positive DC power source, with appropriate filters to smooth typical AC "ripple", capable of producing at least about 10,000 VDC. When a flowing fluid is moved through dielectric/negative electrode space 107, negative electrode 102 is connected to ground, thereby permitting a novel method of particulate and colloid treatment by using the large surface area of the enclosing walls of a liquid tight conduit for presentation of the positive electrical field instead of the smaller surface area of the axial space filling electrode 105. As shown in FIG. 2, a consideration of the collection of positive charges at the liquid containing walls of dielectric 103 will allow the viewer to appreciate that the greater volume of liquid will pass close to the inside wall of dielectric 103, and thus through the positive electrical field, than to the outside wall of negative electrode 105. The prior art comprises a consistent teaching that the reverse polarity should by used for generating electrostatic fields through flowing liquids for imposing on the particles a positive charge. The present invention comprises not only a reverse polarity, but also use of a DC voltage range from about 10,000 to 40,000 VDC or higher with an extremely low power usage of about 5 watts.

In a specific example of the present invention as shown in FIG. 1, 30,000 VDC are applied across electrode 102, a relatively thin copper cylinder with little structural support, to electrode 105, a stainless steel pipe about 1.5 inches OD and extending down the axial cross section of treater 100, through dielectric 103, comprising Kevlar or an equivalent dielectric which forms a liquid tight seal about the axial facing portion of electrode 102 with the support conduit 101, as shown in FIGS. 3 and 4. Support conduit 101 comprises PVC of sufficient strength and thickness to maintain longitudinal support for the flowing fluid and structural integrity of a liquid tight seal between dielectric 103 and support conduit 101. It will be apparent to the skilled person that electrode 102 must be entirely isolated from liquid flowing in space 107 to maintain appropriate capacitance for the electrostatic field to be imposed across space 107. In this specific example, space 107 is about $1/25$ inches with cooling water flowing in that space at about 200 gallons per minute.

The present treater 100 is improved with two other specific embodiments as shown in FIGS. 3 and 4. FIG. 3 is generally a right angle inlet/outlet embodiment 200 such that flowing liquid enters inlet pipe 206 and flows into chamber 204 of right angle connector 203, whereafter the flowing liquid passes to the inlet of the conduit embodiment of the treater of the present invention, of which treater 100 is a part and at the inlet of which is situated in-line or static mixer 207. Flow 209 describes the turbulent flow of the liquid relatively violently against the walls of dielectric 103 such that the flows is driven primarily against its positively charged field. It has been found that the prior art rods and pipes used as the positive electrode could produce an effective electrostatic field of only about 1.0 inches about the electrode. The present invention, however, has dramatically improved the performance of the electrostatic treating field of the conduit treaters with this reversal of polarity.

In FIG. 3, the flowing liquid continues in turbulent flow along space 107 between electrode 105 and dielectric 103 through a second mixer 208, into chamber 202 of right angle connector 201, whereafter the flowing liquid passes to outlet 212. It may be appreciated that electrode 102 comprises a cylinder of conductive material connected to positive DOC current source 210 and encased in a liquid tight containment of the cylinder ends of dielectric 103 sealed to the overlapping cylinder ends of support conduit 101. Negative ground electrode 105 rests with one end in support 205 in the inside wall of connection 203 and extending through the axial space of the cylinder defined by electrode 102 through chamber 202 and the wall of connection 201 with liquid tight seal 211 to the exterior of connection 201 for connection to a ground.

Similarly, a straight flow inlet/outlet embodiment 200' is shown in FIG. 4, wherein flanges 213 are adapted to connect to straight sections of liquid carrying conduit and whereby the treated liquid flows through space 107. Static mixers 207' create turbulent flow but also support electrode 105, which is connected to ground 214.

In yet another embodiment of the present invention, FIG. 5 shows a top view of a plate comprising, as shown in FIG. 6, a top insulating and support layer 303 adapted to form a liquid tight seal about positive electrode 102' in conjunction with dielectric 103'. Dielectric 103' comprises Kevlar or an equivalent liquid sealing and long lasting polymer is coextensive with the downward face of electrode 102' and is sealed at its edges with layer 303. A ground electrode 105' is separated from the downward face of dielectric 103' and is coextensively normal to its downward face such that an electrostatic field is formed in space 107'. Legs 302 raise the assembly of layer 303, electrode 102' and dielectric 103' above electrode 105' such that a space is created having apertures between that assembly and the upward face of electrode 105', whereby liquids may flow therebetween and particulates and colloids may obtain a mainly singular charge.

The lengths of the treater 100 sections commercially appropriate for many applications comprise lengths of 18, 24 or 36 inches depending on flow rates, particulate concentration, polarity of the liquid, degree of required particulate non-aggregation or surface adhesion in a downstream process or application, and other such variables.

The present invention also comprises using one treater 100 section of the above embodiments to produce a liquid stream of primarily positively charged particulates and a treater generating such an electrostatic field that a second liquid stream comprises primarily negatively charged particles, whereafter the first and second liquids are flowed quiescently into a common container, albeit from opposite sides of the container. The container will thereby have therein an interface zone between a positive zone in which the first liquid exists with positively charged particles and a negative zone in which the second liquid exists with negatively charged particles. The interface zone thereby induces a state of preferential aggregation such that the aggregates may, upon reaching critical size and density in relation the motion of the liquid in the interface zone, fall to the bottom of the container to be easily removed without substantially adhering to the walls of conduits or the container.

In another embodiment of the present invention, the above embodiments may be used in the specific applications of treating liquids from chillers, cooling towers, steam boilers, tubesides of heat exchangers, plate and frame exchangers, reverse osmosis systems, river water, domestic hot water loops, commercial dishwashers, ice machines, machine shop coolant systems, nozzle sprayers, scrubber systems and water softening systems.

Figure 7:
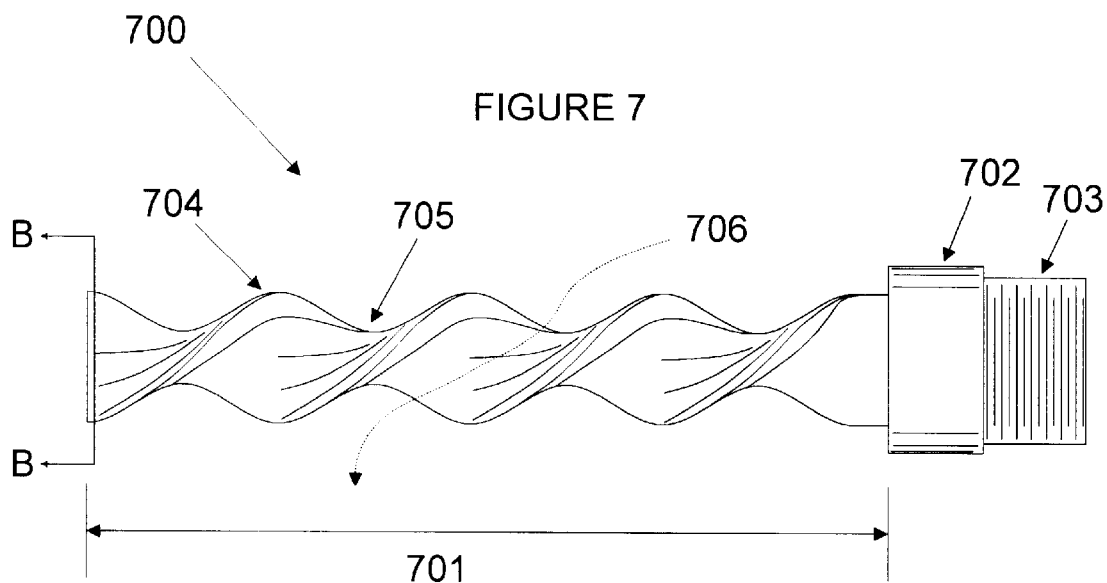
FIG. 7 is side view of an improvement of a vessel-insertable or conduit-insertable electrode as disclosed in U.S. Pat. No. 4,073,712, which is incorporated herein by reference.
Figure 8:
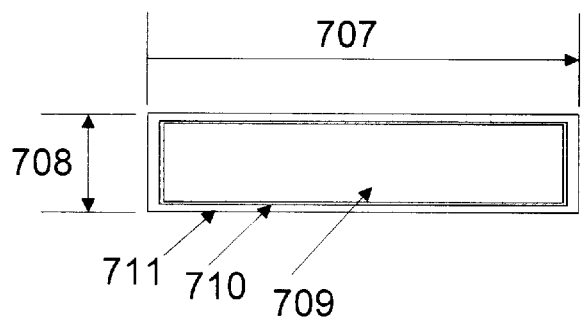
FIG. 8 is the section B—B shown in FIG. 7.

With reference to FIGS. 7 and 8, an improvement of a vessel-insertable or conduit-insertable electrode 700 is shown. One of the most important requirements of liquid treatment by electrostatic field wherein the positive field is disposed about an axially located electrode as shown in U.S. Pat. No. 4,073,712 is to create as much liquid flow through the effective electric field range as possible, thereby causing a greater percentage of particulates evenly distributed through the flowing liquid to be affected by the electric field. When laminar flow occurs across the insertable positive electrode, the system configuration and electric field strength, when all particulates must be within the effective electric field, are strictly determined by the distance from the outsided surface of the insulating dielectric of the positive electrode to the inner surface of the conduit or vessel. It is a further invention to provide within such a laminer flow conduit or vessel a positive electrode having integral flow turbulating means such that laminar flow liquids approaching the electrode are moved about the positive electrode and are substantially all the particles lying within the flowing liquid are brought within the effective electric field although theoretically outside of the effective electric field range as predicted in U.S. Pat. No. 4,073,712.

FIG. 7 shows the insertable electrode 700 having a turbulating length 701 comprising structural support composite 709, conductive layer 710 and dielectric layer 711, as shown in FIG. 8. The generally disclosed "twists" in length 701 comprise in the side view of FIG. 7 the sloping ridge 704 and sloping valley 705. Length 701 is connected electrically to threaded connector 702/703.

Electrode 7 is preferably and most inexpensively fabricated from a single piece of composite polymers and fibers or a single polymer such that it may effectively provide all the structural support needed by the electrode 700 to accomplish the objects of this invention. The single piece is originally formed as a flat piece of rectangular stock having measurements of a thickness 708, width 707 and length 701, which in a specific embodiment are respectively about 0.5 inches, 1.5 inches and 36 inches. This single piece is treated with heat or other appropriate methods to cause the flat stock to be twisted with respect to the two ends of the length 701. The number of twists shown in FIG. 7 is three over a length of about 36 inches, however the number of twists may be from 1 to 5 or more depending on the liquid flow properties and required structural strength required for maintaining the electrode 700 in a appropriate axial space position in the conduit, as well as providing a desired liquid turbulence as shown the liquid path 706 in FIG. 7.

The twisted single piece is then dipped in a conductive metal, such as copper, which will appropriately plate on the outer surface of the twisted single piece. This conductive metal becomes the positive electrode material as shown in FIG. 8 as conductive layer 710. The composite twisted single piece 709 plated with an appropriate thickness of a conductive layer 710 is then dipped or otherwise coated with a relatively high dielectric material such as Kynar® or Kevlar® or less preferably Teflon®. One end of the length 701 is electrically connected with liquid tight seal about its contacting circumference to connector 702, which is connected to threaded piece connector 703. The assembly of these separate pieces comprise the electrode 700 which is insertable into a relatively small orifice of a conduit or vessel for creation of an electrostatic field. Length 701 may also extend from less than 24 inches to 48 inches or more, although above 48 inches structural support may need to be enhanced with some electrically neutral support means. Thickness 708 and width 707 are primarily dependent on the requirements for structural strength as well as the required difference in height between ridge 704 and valley 705 to generate a desired turbulence in the flowing liquid.

With reference to FIGS. 9 and 10, alternate embodiments of the present invention are now described. Electrode 800 comprises a threaded connection consisting of a base piece 801 and threaded section 805, the two being integrally joined such that section 805 is threadably and sealingly connectable to a threaded pipe opening, that opening arranged to provide an electrode location in the pipe as shown substantially as in FIG. 1. Electrode 800 is base supportable so that piece 801 abuts an exterior face of a pipe opening for sealing against liquid leaks.

Electrode 800 is shown having a base electrode section 802 and end section 803, with a broken away portion to indicate that the overall electrode length 822 is preferably provided for current commercial designs of 24, 29 and 39 inches corresponding to sections 802 and 803 combined lengths of 18, 24 and 36 inches. It is understood that distance 107 of FIG. 1 comprises a generally effective distance from the surfaces of sections 802 and 803 to the inside surface of an electrically conductive portion of the enclosing pipe electrically connected with metallic section 805, section 805 electrically connected with ground (negative) connection wire 806 that passes through bores 808, 809 and 811 to reach from an pipe-external connection to an inside surface connection to section 805. It will be readily appreciated that the polarity of the embodiments of FIGS. 9 and 10 are opposite in relation to pipe and electrode as compared to the embodiments of FIGS. 1–4.

As seen in FIG. 10, piece 801 and section 805 provide base support for section 802 in the circular bore of section 805 communicating with the smaller diameter bore 808 of piece 801. That circular bore of section 805 has a slightly large diameter that of the cylindrical section 802 so that the right end of section 802 may be potted in an epoxy 810. A thin insulating layer 819 extends around and defines an outer surface of sections 802 and 803. Layer 819 consists of thin layer of PVC, Teflon®, or other equivalent material. The skilled person is instructed with this disclosure of layer 819 that Teflon® is generally more expensive than PVC and is preferred in applications where the operational liquid temperature is above about 130° F., while PVC may be used below that temperature, as in warmed cooling water flows.

Dielectric layer 816 forms an interface 817 with the inside surface of layer 819. Interface 817 may comprise a connective epoxy for securing the layers together. Layer 816 comprises dielectric material to accomplish the objects of the invention system. A preferred material for layer 816 is Red Kynar® Flex. Kynar Flex® resins are similar to Kynar® resin in purity and chemical resistance, but they have higher chemical compatibility in high pH solutions, increased impact strength, and better clarity. In thin sections of tubing, Kynar is flexible and transparent. In the prior art, such resins are routinely used for corrosion protection. In the present invention, it has been found that layer 816 is the location of an intense electric field when the invention is operated at a preferred 20,000 to 40,000 VDC. It has been found that the dielectric properties of the Kynar® resins, and especially Red Kynar® Flex, for the electrostatic induction of liquid borne particles at high voltages are superior to many other materials. Breakdown of other dielectrics in this application mean that the electric field quickly "burns" through the dielectric and liquid sealing insulation, causing the electrode to short out and be destroyed.

In one specific embodiment, the thickness of the layer 816 is about 2.44 mm of Red Kynar® Flex with an outside diameter of about 38.33 mm. A range of effective specifications for this material will permit thicknesses of from 0.5 mm to over 5 mm, although the range of 1.5–3 mm is more preferable. Other appropriate dielectrics may be substituted such as other halogenated hydrocarbon polymers or other materials having similar dielectric properties.

Layer 813 is a conductor layer comprising metal or highly conductive composites effective for providing an evenly and axially distributed electrical field about the electrode. As such, it is preferable that interface 815 between layers 816 and 813 comprise a conductive epoxy for enhancing dielectric properties of layer 816 and structural support. Layer 813 in one embodiment is a copper cylinder with a thickness of about 1.48 mm with a narrow longitudinal slot cut into it (about 0.5–5 millimeters), such that the cylinder, in construction of the electrode, is inwardly compressed to reduce its effective outside diameter and then allowed to expand so that its outside surface is tightly held against the inside surface of layer 816. This tight fit of the conductor against the dielectric improves electrode operation and provides for non-destructive expansion and contraction of the copper tube when it is heated or cooled in contact with layer 816. The differential thermal coefficients of expansion of the layers 813 and 816 is one of the most serious problems of the prior art for such electrodes. Dielectrics effective for the electrodes of in the field present invention have very different such coefficients, such that a rapidly heated and expanding metal conductor will cause the dielectric to fracture, followed by electrode failure.

In another embodiment of the present invention, layer 813 comprises a solid aluminum cylinder having an outside diameter of about 34.1 mm, thereby leaving about 1 mm space between the aluminum and the inside surface of layer 816 at room temperature. Conductive epoxy preferably fills that space, although the superior flex and toughness of the Kynar® resins permit substantial aluminum expansion without rupture of the dielectric or substantial compromise of the electrical field around the electrode. Highly polycrystalline materials improve electrostatic induction for the present invention, such that other polymers such as KEVLAR® (long molecular chains produced from poly-paraphenylene terephthalamide) are also extremely useful as dielectrics for electrode 800. Useful for dielectrics of the present invention are other polycrystalline polymers such as polyfluorinated hydrocarbon polymers such as Kynar® (polyvinylidene fluoride) and less preferably Teflon®. Kynar is a tough engineering thermoplastic that exhibits the stable characteristics of the fluoropolymers with more creep resistance, tensile and impact strength.

For structural support, the ends of layer 812 abut substantially solid plugs at either end of bore 814. As described above, at the threaded end of the electrode, the plug comprises a small passage for wiring of the electrode and positive pole connection 812.

A preferred power supply for the electrode 800 permits modulation of the potential from 20,000 to 40,000 VDC depending on input from transducers upstream and/or downstream measuring particulates, pH, flow rate, temperature, ionizing and polar component concentrations, and other such inputs for processes affected by the electrode 800 treatment of flowing liquids.

Although it is not known presently, the Red Kynar® Flex is a far superior dielectric in resisting "burn-out" for the high voltage operation of the invention electrode. A present preferred current is around from 100–150 microamps DC. The Black Kynar® and clear Kynar® have far reduced effectiveness as compared to the Red Kynar® Flex as a dielectric in the invention electrode.

The above design disclosures present the skilled person with considerable and wide ranges from which to choose appropriate obvious modifications for the above examples. However, the objects of the present invention will still be obtained by the skilled person applying such design disclosures in an appropriate manner.

What is claimed is:

1. An electrode assembly for treating a flowing fluid with an electrostatic field comprising:

(a) a conduit having an inside surface adapted to operate as a negatively charged surface for an electrostatic field, the conduit further adapted to contain the flowing fluid:

(b) an electrode adapted to be located generally within an axis of the conduit and adapted to maintain a potential difference between the electrode and the inside surface of the conduit of over 10,000 volts DC and a current in the order of microamps, such that a negative pole of a DC power supply is electrically connected to the inside surface of the conduit and the electrode is electrically connected with a positive pole of the power supply;

(c) the electrode substantially having the shape of a cylindrical rod and having a thin surface layer sealing from the flowing liquid successive adjacent layers of a cylindrical dielectric layer and cylindrical conductor layer;

(d) the dielectric layer comprising a substantially thin polymer layer of a polymer selected from the group consisting of polyvinylidene fluoride and poly-paraphenylene terephthalamide close to and in electrical field contact with the conductor, and (e) the conductor comprising a hollow cylinder electrically connected to the positive pole of the power supply.

2. The electrode of claim 1 wherein the thickness of the dielectric layer is from about 0.5 millimeters to 4 millimeters.

3. The electrode of claim 2 wherein the thickness of the dielectric layer is from about 1.5 millimeters to 3 millimeters.

4. The electrode of claim 1 wherein the conductor is a slotted copper tube wherein the slot is adapted to permit expansion of the tube against the inside surface of the dielectric layer on installation thereagainst.

5. The electrode of claim 1 wherein the electrode is adapted to be located generally within an axis of the conduit and further adapted to be capable of maintaining a potential difference between the electrode and the inside surface of the conduit of over about 30,000 volts DC without burning through the dielectric layer.

6. The electrode of claim 1 wherein the surface layer comprises a layer of polyvinyl chloride less than about 4 millimeters thick.

7. The electrode of claim 1 wherein the power supply is adapted to modulate between about 20,000 to 40,000 volts DC dependent on input from a process variable signal measured at a transducer for a process condition of the flowing liquid. psia.

* * * * *